(12) United States Patent
Harrison et al.

(10) Patent No.: US 12,159,524 B1
(45) Date of Patent: Dec. 3, 2024

(54) COLLISION WARNING SYSTEM FOR SAFETY AND CONSTRUCTION ENVIRONMENTS

(71) Applicants: Duncan Harrison, Tomball, TX (US); Jason Gossiaux, Leander, TX (US)

(72) Inventors: Duncan Harrison, Tomball, TX (US); Jason Gossiaux, Leander, TX (US)

(73) Assignee: Duncan Harrison, Tomball, TX (US)

( * ) Notice: Subject to any disclaimer, the term of this patent is extended or adjusted under 35 U.S.C. 154(b) by 61 days.

(21) Appl. No.: 17/583,606

(22) Filed: Jan. 25, 2022

Related U.S. Application Data

(63) Continuation of application No. 17/462,393, filed on Aug. 31, 2021, now abandoned.

(60) Provisional application No. 63/073,435, filed on Sep. 1, 2020.

(51) Int. Cl.
| | |
|---|---|
| *H04W 4/90* | (2018.01) |
| *G01S 1/04* | (2006.01) |
| *G01S 1/68* | (2006.01) |
| *G01S 5/02* | (2010.01) |
| *G08B 7/06* | (2006.01) |
| *G08B 21/02* | (2006.01) |
| *G08B 25/01* | (2006.01) |
| *H04W 4/02* | (2018.01) |

(52) U.S. Cl.
CPC .......... *G08B 25/016* (2013.01); *G01S 1/0428* (2019.08); *G01S 1/68* (2013.01); *G01S 5/0231* (2013.01); *G08B 7/06* (2013.01); *G08B 21/02* (2013.01); *H04W 4/023* (2013.01); *H04W 4/90* (2018.02)

(58) Field of Classification Search
CPC ........ G08B 25/016; G08B 7/06; G08B 21/02; H04W 4/90; H04W 4/023; G01S 1/0428; G01S 1/68; G01S 5/0231
See application file for complete search history.

(56) References Cited

U.S. PATENT DOCUMENTS

| | | | |
|---|---|---|---|
| 10,118,593 B2* | 11/2018 | Dellock | B60R 25/06 |
| 2009/0237233 A1* | 9/2009 | Smith | G08B 6/00 |
| | | | 340/539.1 |
| 2015/0075446 A1* | 3/2015 | Hu | A01K 15/023 |
| | | | 119/718 |
| 2016/0000042 A1* | 1/2016 | Smith | A01K 15/023 |
| | | | 119/721 |
| 2016/0066842 A1* | 3/2016 | Kokkoneva | A61B 5/742 |
| | | | 600/479 |
| 2019/0096222 A1* | 3/2019 | Kato | H04W 4/80 |
| 2020/0380533 A1* | 12/2020 | Lines | G01C 21/3492 |
| 2021/0219095 A1* | 7/2021 | Iyer | H04W 4/023 |
| 2022/0215734 A1* | 7/2022 | Pozzini | G08B 21/24 |
| 2022/0301410 A1* | 9/2022 | Erdmann, IV | H04W 76/19 |

* cited by examiner

*Primary Examiner* — Dai Phuong
(74) *Attorney, Agent, or Firm* — Faegre Drinker Biddle & Reath LLP

(57) ABSTRACT

A collision warning system configured to provide a warning or alert to workers in environments where collisions with hazards (e.g., moving vehicles and equipment, or fixed hazards) may occur. The system includes a hazard node including a transmitter for emitting a beacon, and a body worn device including a receiver for receiving the beacon, a controller operably coupled to the receiver, and an indicator operably coupled to the controller.

14 Claims, 5 Drawing Sheets

COLLISION WARNING SYSTEM FOR SAFETY AND CONSTRUCTION ENVIRONMENTS

CROSS-REFERENCE TO RELATED APPLICATION

The present application is a continuation of U.S. patent application Ser. No. 17/462,393, filed Aug. 31, 2021, which claims the benefit of U.S. Provisional Application No. 63/073,435, filed Sep. 1, 2020, the complete disclosure of which is incorporated herein by reference.

BACKGROUND AND SUMMARY OF THE DISCLOSURE

The present disclosure relates generally to warning and avoidance systems for use in hazardous environments. More particularly, the present disclosure relates to a dual frequency warning and avoidance system for use in safety and construction environments to help prevent collisions of workers with moving vehicles and equipment, or with fixed hazards, by providing an early warning or alert of proximity of the hazard to the worker.

Although warning and collision avoidance systems are known, few effective systems appear in the market. This leaves workers and businesses with a continuing need for adequate protection in hazardous workplace environments. Existing systems also typically rely on complex and unreliable methods for determining proximity to hazards. And in some cases they are intended to provide vehicle control, rather than to alert the worker of an impending danger.

Examples of environments that would benefit from a wearable early warning hazard system include, but are not limited to:
  Roofing projects with skylights and other fixed hazards;
  Road projects with open manhole covers, ditches and drains;
  Construction sites with dump trucks and other heavy machinery driving in and out; and
  Fracking locations with diesel trucks frequently refueling assets on site.

Thus, it is advantageous to implement an improved, wearable solution to alert workers of fixed and mobile dangers at the job site.

According to an illustrative embodiment of the present disclosure, a collision warning and avoidance system includes a stationary or primary transmitter and a secondary receiver, with the primary transmitter emitting a beacon to be received by the secondary receiver. An accelerometer may be combined with a global positioning system (GPS) device to determine the acceleration and speed of a vehicle which may be used to determine when to provide a warning signal to the secondary receiver.

The hazard node may further include an accelerometer and a controller operably coupled to the accelerometer, wherein the controller varies the emitting of the first beacon and the second beacon based upon input from the accelerometer. The first indicator may comprise a motor configured to vibrate the body worn device at a first frequency in response to the first beacon. The motor may be configured to vibrate the body worn device at a second frequency in response to the second beacon. The collision warning system may further comprise a second indicator including an audio device configured to provide an audible signal in response to the second beacon. The audio device may comprise one of a piezo or a speaker. The body worn device may comprise a fob attached to an armband.

According to another illustrative embodiment of the present disclosure, a collision warning system is disclosed. The collision warning system comprises a fob comprising: a first microcontroller, a first radio operably coupled to the microcontroller, a first antenna operably coupled to the radio and configured to detect a first beacon frequency, and a second antenna operably coupled to the radio and configured to detect a second beacon frequency, wherein the second beacon frequency is different from the first beacon frequency. The fob further comprises a motor operably coupled to the microcontroller and a piezo or speaker operably coupled to the microcontroller. The collision warning system also comprises a hazard node, comprising: a second microcontroller, a second radio operably coupled to the second microcontroller, a third antenna operably coupled to the second radio and configured to transmit a first beacon at the first beacon frequency, and a fourth antenna operably coupled to the second radio and configured to transmit a second beacon at the second beacon frequency.

At least one of the fob and the hazard node may further comprise an accelerometer. at least one of the fob and the hazard node may further comprise a user interface. The hazard node may be configured to simultaneously transmit the first beacon and the second beacon. The hazard node may be configured to transmit the first beacon and the second beacon continuously at predetermined intervals. The motor may be placed in a first operation mode to vibrate at a first frequency when the fob is at or within a first distance relative to the hazard node. The motor may be placed in a second operation mode to vibrate at a second frequency when the fob is at or within a second distance relative to the hazard node, the second distance being less than the first distance. The piezo or speaker may be placed in a third operation mode to issue an audible alert when the fob is at or within a third distance relative to the hazard node, the third distance being less than the second distance.

According to yet another illustrative embodiment of the present disclosure, a method of operating a collision warning system is disclosed. The method comprises transmitting a first beacon at a first beacon frequency from a hazard node: transmitting a second beacon at a second beacon frequency from the hazard node, the second beacon frequency being different from the first beacon frequency: detecting at least one of the first beacon and the second beacon; and placing a first indicator of a body worn device into an operation mode.

The method may further comprise determining a distance between the hazard node and the body worn device. The distance between the hazard node and the body worn device may be a first predetermined distance and the first indicator may be a motor configured to vibrate the body worn device. The distance between the hazard node and the body worn device may be a second predetermined distance that is less than the first predetermined distance, and the method may further comprise placing a second indicator of the body worn device into an operation mode in response to detecting the second predetermined distance. The first beacon and the second beacon may be transmitted substantially simultaneously.

According to another illustrative embodiment of the present disclosure, a collision warning system includes a hazard node having a transmitter for emitting a first beacon and a second beacon, the first beacon and the second beacon transmitted at different frequencies. The system further includes a body worn device having a receiver for receiving the first beacon and the second beacon, a controller operably coupled to the receiver, and a first indicator operably coupled to the controller.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
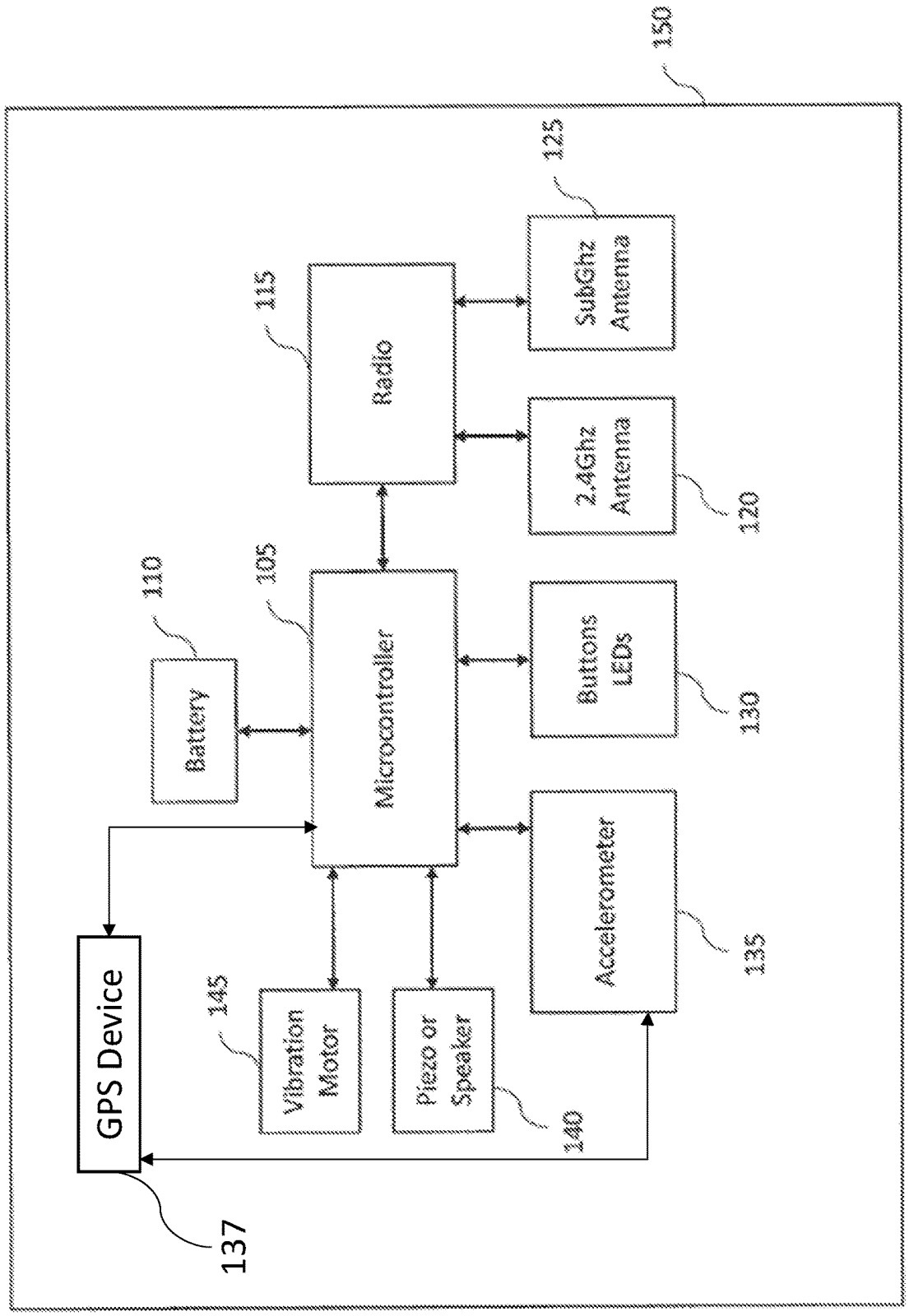
FIG. 1 is a block diagram of the internal components of an illustrative arm-worn alert unit.

For the purposes of promoting and understanding the principles of the present disclosure, reference will now be made to the embodiments illustrated in the drawings, which are described herein.

FIG. 1 is a block diagram illustrating electronic components of a body worn component, illustratively a fob 150, of an illustrative collision warning system of the present disclosure. The fob 150 may be supported on any convenient part of the user's body, such as by an arm or leg band, a belt holster, or a hat or helmet. The fob 150 is powered by a battery 110, with both primary cell and rechargeable options possible. A microcontroller 105 monitors the status of an accelerometer 135 to control sleep power consumption and duty cycling for long battery life, as further discussed in relation to the accelerometer 235 discussed below. A user interface 130 illustratively includes buttons and light emitting diodes (LEDs) to allow a user to turn on and configure the device as needed.

When enabled, the armband radio 115 sits in receive mode listening for alert beacons of nearby hazard nodes 250. RF signals of different frequencies propagate along different paths through an environment. Higher frequency signals attenuate more over the same distance compared to lower frequency signals. Lower frequency signals also penetrate materials more effectively, thereby suffering from reduced multipath interference and better coverage in an obstructed environment. Higher frequency signals tend towards line-of-sight modes of operation. Therefore, a first receiver, or antenna 125, is configured to detect and receive beacons at a first frequency. The antenna 125 works with a radio 115 to operate a first signal chain, which provides a first alert via a first indicator. For example, upon hearing a beacon at the first frequency, the fob 150 will produce a tactile alert to the user through an actuator, such as a motor 145 causing a vibration at a first vibration frequency.

A second receiver, or antenna 120, is configured to detect and receive beacons at a second frequency. The antenna 120 works with the radio 115 to operate a second signal chain, which is intended for short range, immediate alerts. For example, upon receiving a beacon at the second frequency, the fob 150 may produce a second alert via a second indicator, for example, both of or one of an enhanced alert utilizing tactile output (e.g., via the motor 145, providing a vibration at a second, higher vibration frequency or providing a vibration at the first vibration frequency) and audio output (e.g., via a piezo or speaker 140). In some embodiments the second alert may include only one of the audio alert and the vibration alert, while in other embodiments both of the audio alert and the vibration alert may be provided. In an embodiment, the first frequency may be approximately 125 subGhz, about 700 MHZ, about 780 MHZ, about 800 MHZ, about 863-870 MHZ, about 900 MHZ, about 902-28 MHz, or about 950-960 MHZ. The second frequency may be approximately 2.4 GHZ or 2.5 GHZ. For example, an embodiment may be intended to work in the U.S. ISM bands, 902-928 MHz and 2.4-2.5 Ghz. Units will allow configuration within a set of channels in each band to avoid interference.

Figure 2:
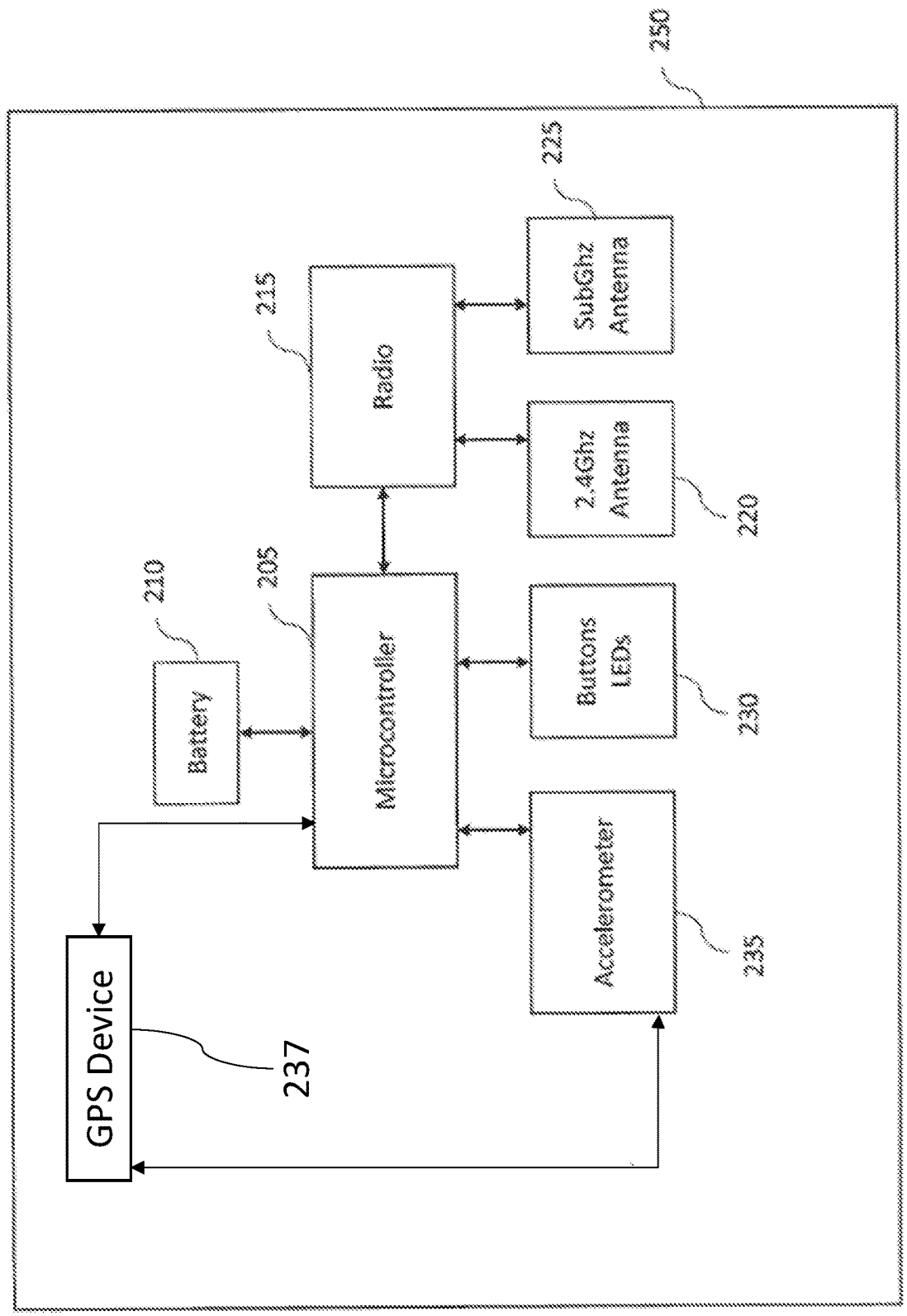
FIG. 2 is a block diagram of the internal components of an illustrative hazard node.

FIG. 2 is a block diagram illustrating electronic components of the hazard node 250 of the illustrative collision warning system of the present disclosure. The node 250 is also powered off a battery 210, with both primary cell and rechargeable options possible. The user also powers and configures the unit with a user interface 230, including buttons and light emitting diodes (LEDs). Unlike the body worn fob 150, the hazard node 250 regularly transmits beacons across both 2.4 Ghz and Sub-GHz antennas 220, 225. In some embodiments, the beacons may be transmitted across both the first frequency and the second frequency simultaneously or substantially simultaneously. In other embodiments, beacons may only be transmitted across one of the first frequency or the second frequency at any given time. The beacons may be continuously issued at predetermined intervals or may be issued upon other direction of the microcontroller per operation of the accelerometer or other desired settings. The radio 115 consists of a discrete 2.4 GHZ and a discrete Sub-GHz signal chain and PHY. These operate independently with a programmable packet size and transmit power.

An accelerometer 235 is also present within the hazard node 250 and allows the microcontroller 205 to duty cycle the unit into lower power modes of operation. The accelerometer 235 allows each device to detect movement. The presence of movement illustratively results in an increase of beacon activity, and the absence of movement illustratively results in a reduction of beacon activity. This allows the system to dynamically scale as the movement (and therefore the risk) increases, and to be reduced and/or enter a sleep mode to conserve battery life when movement (and therefore risk) decreases. The accelerometer 235 may also cooperate with a global positioning system (GPS) device 237 to determine speed and/or acceleration of an underlying object 500 (FIG. 5), such as a vehicle, wherein the microcontroller 205 instructs increased or decreased beacon activity when the acceleration and/or speed of the underlying object 500 bypasses a predetermined threshold. The accelerometer 135 and GPS device 137 of the fob 150 operate as disclosed herein relative to the accelerometer 235 and GPS device 237.

Figure 3:
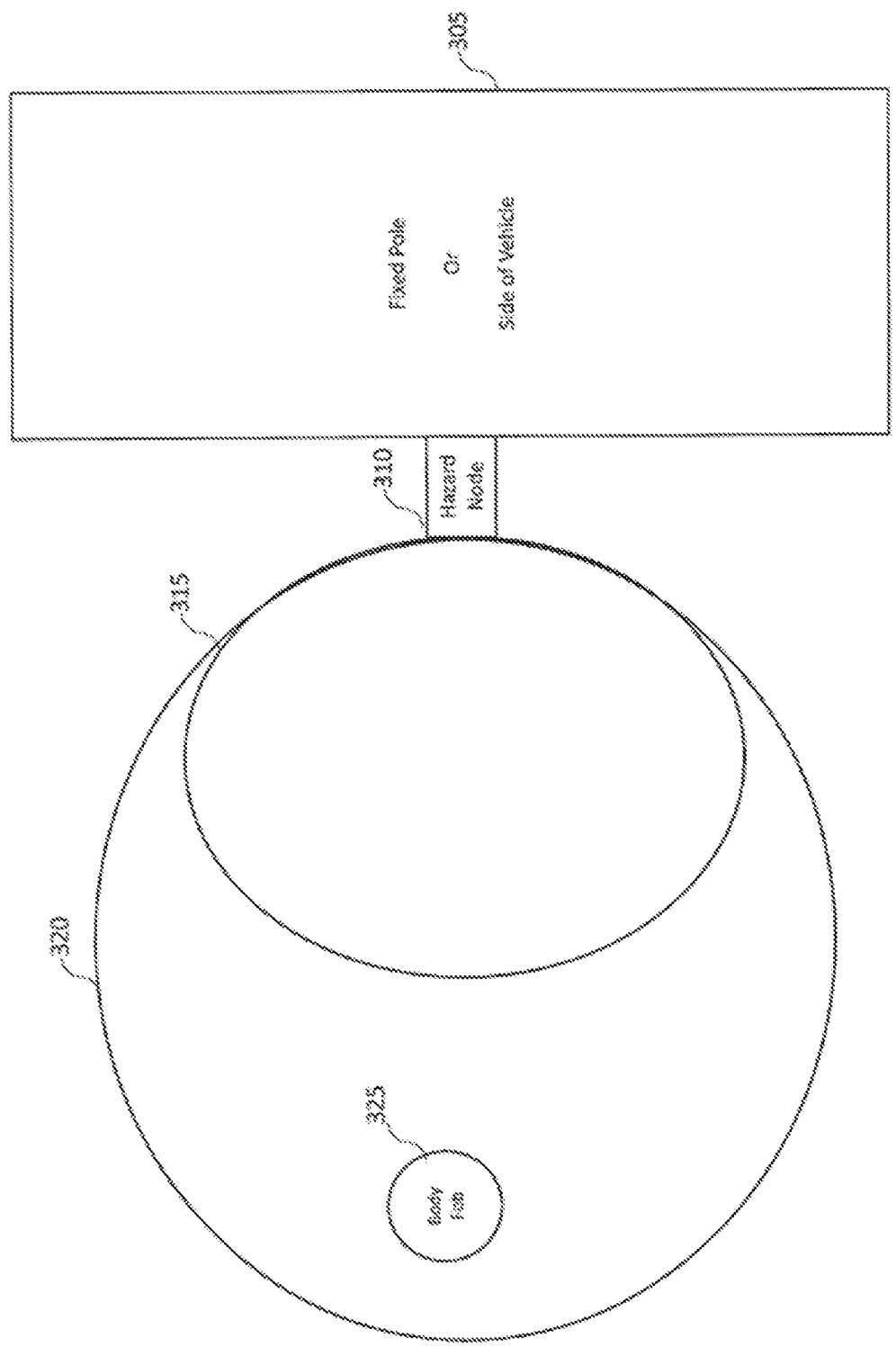
FIG. 3 is a schematic representation of an illustrative mounted hazard node embodiment and its radiation pattern.

FIG. 3 illustrates a sample environment with a body worn alert fob 325 (which illustratively may be fob 150), and a hazard node 310 (which illustratively may be node 250) mounted on a stick or to a side of a construction vehicle 305. FIGS. 1 and 2 represent the internal componentry of illustrative nod 310 and illustrative fob 325 in FIG. 3. The hazard node 310 periodically broadcasts a 2.4 GHz short range beacon 315 and a Sub-Ghz longer range beacon 320. Any body fob 315 in range of either or both of these signals 315, 320 would then alert its user through tactile or audible means.

Figure 4:
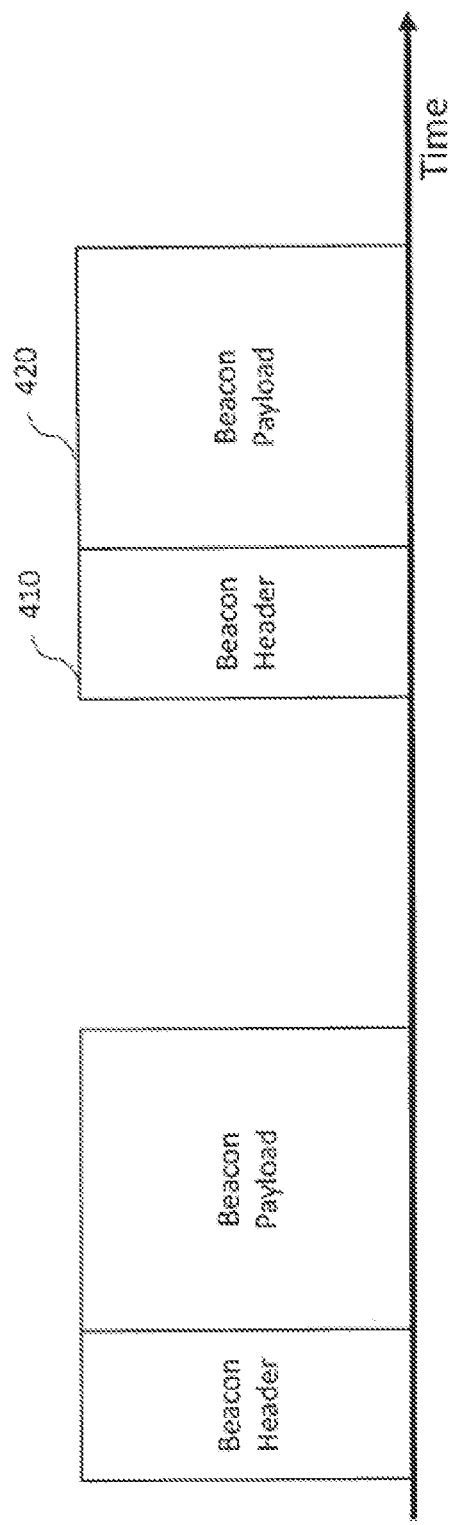
FIG. 4 is an illustration of an illustrative embodiment of the packet protocol for a hazard node.

FIG. 4 illustrates a sample over the air packet from the beacon 315 to the fob 325, where the x-axis represents time. A header 410 allows the node 310 to determine if the message is valid, and the payload 420 might contain information such as signal strength, speed, battery life, asset type and more to assist the node 310 with determining what kind of alert is necessary. The multiple payloads/headers reflect multiple messages being sent over time.

Figure 5:
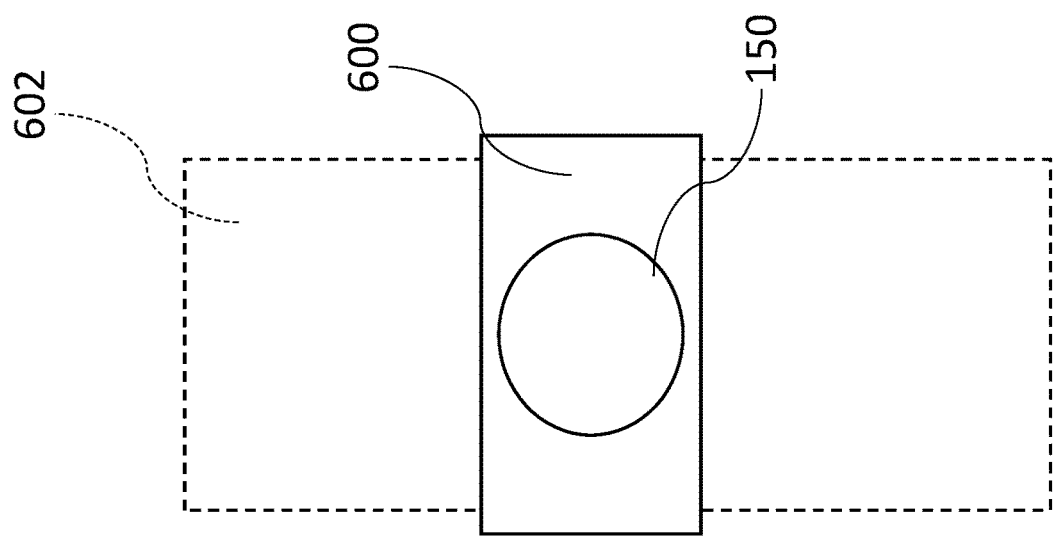
FIG. 5 is a schematic representation of an illustrative mounted hazard node and an illustrative arm-worn alert unit within predetermined distances of each other.
Figure 5:
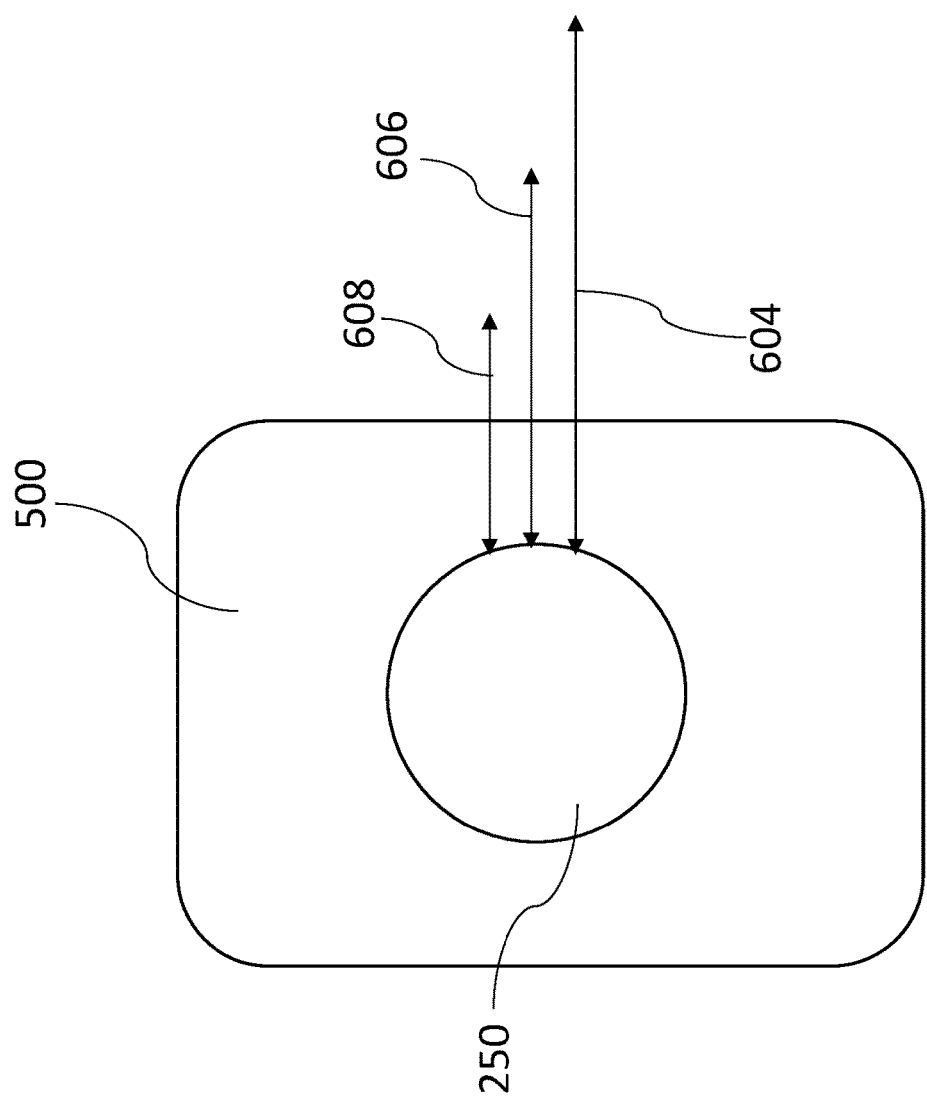

Referring to FIG. 5, as described above, the hazard node 250 (which illustratively may be hazard node 310) may be attached to an object, representatively shown by object 500, to be avoided or an object 500 within an area to be avoided. For example, the object 500 may illustratively be within or illustratively be a moving piece of equipment, including construction vehicles, trucks, or other heavy machinery; stationary objects that should be avoided to mitigate injury or damage, such as pipes, buildings, structures, trees, etc.; danger areas, such as no crossing areas, no entry areas, skylights on roofs, rubble area demo areas, etc.; and other objects or places as desired. The hazard node 250 may be removably attached to the object 500 so that the hazard node 250 may be removed without causing damage to the underlying object 500 upon removal. The hazard node 250 may be attached, for example, using a light adhesive or removable mechanical fastener. In some instances, it may be desired to permanently attach the hazard node 250 to the underlying object 500.

The fob 150 (which illustratively may be fob 325) may be removably or permanently attached to an armband 600, which is configured to be worn about the arm of a user 602. Use of the armband 600 provides a close fit of the fob 150 to the user 602 without causing interference to the user 602 while a task is being completed. The fob 150 may be configured to alert the user 602 when the fob 150 registers a predetermined distance to the hazard node 250 (FIG. 5A). For example, when the fob 150 is positioned at or within a first distance 604, such as 15 feet, of the hazard node 250, the fob 150 may produce a relatively low tactile warning, such as a vibration, facilitated by the vibration motor 145 (FIG. 1). When the fob 150 is positioned at or within a second distance 606, such as 10 feet, of the hazard node 250, the fob 150 may produce a relatively high tactile warning, such as a vibration, facilitated by the vibration motor 145. When the fob 150 is positioned within a third distance 608, such as 5 feet, of the hazard node 250, the fob 150 may produce an audible alarm or alert facilitated by piezo speaker 140 (FIG. 1). The first distance 604, the second distance 606, and the third distance 608 as described above are intended as example only. A relatively further distance or a relatively nearer distance may be utilized as desired depending on the perceived hazard or positioning of the hazard node 250 on the underlying object 500. The distance between the hazard node 250 and the fob 150 is determined at least in part by whether the fob 150 detects a short range beacon or a long range beacon as described above.

The fob 150 may include a global positioning system function using GPS device 137 to provide an alert to emergency services or others in the area of an emergency event in an instance, for example, when the hazard node 150 and the fob 150 collide or come within a predetermined distance from each other. The fob 150 may be configured to pair with only a single hazard node 250 or several hazard nodes 250 so that a user only needs to wear one fob 150 to remain alert of a plurality of hazards within a given area.

Although the invention has been described in detail with reference to certain preferred embodiments, variations and modifications exist within the spirit and scope of the invention as described and defined in the following claims.

The invention claimed is:

1. A collision warning system comprising:
   a fob comprising:
      a first microcontroller,
      a first radio operably coupled to the microcontroller,
      a first antenna operably coupled to the first radio, the first antenna configured to detect a first beacon frequency,
      a second antenna operably coupled to the first radio, the second antenna configured to detect a second beacon frequency, the second beacon frequency being different from the first beacon frequency,
      a motor operably coupled to the first microcontroller, and
      a piezo or speaker operably coupled to the first microcontroller; and
   a hazard node comprising:
      a second microcontroller,
      a second radio operably coupled to the second microcontroller,
      a third antenna operably coupled to the second radio, the third antenna configured to transmit a first beacon at the first beacon frequency, and
      a fourth antenna operably coupled to the second radio, the fourth antenna configured to transmit a second beacon at the second beacon frequency-;
      wherein the motor is placed in a first operation mode to vibrate at a first frequency when the fob is at or within a first distance relative to the hazard node;
      wherein the motor is placed in a second operation mode to vibrate at a second frequency when the fob is at or within a second distance relative to the hazard node, the second distance being less than the first distance; and
      wherein the piezo or speaker is placed in a third operation mode to issue an audible alert when the fob is at or within a third distance relative to the hazard node, the third distance being less than the second distance.

2. The collision warning system of claim 1, wherein at least one of the fob and the hazard node further comprise an accelerometer.

3. The collision warning system of claim 2, wherein the hazard node enters into a sleep mode when the accelerometer detects reduced movement.

4. The collision warning system of claim 1, wherein at least one of the fob and the hazard node further comprise a user interface.

5. The collision warning system of claim 1, wherein the hazard node is configured to simultaneously transmit the first beacon and the second beacon.

6. The collision warning system of claim 1, wherein the hazard node is configured to transmit the first beacon and the second beacon continuously at predetermined intervals.

7. A method of operating the collision warning system of claim 1, the method comprising:
   transmitting a first payload from the first beacon at the first beacon frequency from the hazard node;

transmitting a second payload from the second beacon at the second beacon frequency from the hazard node, the second beacon frequency being different from the first beacon frequency;
   wherein the payload comprises at least one of information of signal strength, speed of the hazard node, battery life, and asset type;
detecting at least one of the first beacon and the second beacon; and
placing an indicator of a body worn device into an operation mode;
   wherein the operation mode is at least one of the first operation mode, the second operation mode, or the third operation mode;
   wherein the indicator is placed in the first operation mode when a first threshold is met;
   wherein the indicator is placed in the second operation mode when a second threshold is met, the second threshold being different from the first threshold; and
   wherein the indicator is placed in the third operation when a third threshold is met, the third threshold being different from the first and the second threshold.

8. The method of claim 7, further comprising determining a distance between the hazard node and the body worn device.

9. The method of claim 8, wherein when the distance between the hazard node and the body worn device is the first distance the first threshold is met and the indicator is a first indicator, the first indicator is put into the first operation mode.

10. The method of claim 9, wherein when the distance between the hazard node and the body worn device is the second distance the second threshold is met and the first indicator is put into the second operating mode, the second distance being less than the first distance.

11. The method of claim 10, wherein when the distance between the hazard node and the body worn device is the third distance the third threshold is met and the indicator is a second indicator, the second indicator is put into the third operation mode, the third distance being less than the first distance and the second distance.

12. The method of claim 11, wherein the second indicator is the audible alert.

13. The method of claim 7, wherein the first beacon and the second beacon are transmitted substantially simultaneously.

14. The collision warning system of claim 1, wherein the fob is attached to an armband to form a body worn device.

* * * * *